March 13, 1956

E. COOK 2,737,870

APPARATUS FOR MOUNTING EARTH WORKING
TOOLS IN CULTIVATORS AND THE LIKE

Filed May 17, 1952

EINAR COOK
INVENTOR

HUEBNER, BEEHLER,
WORREL & HERZIG
ATTORNEYS

BY Richard M. Worrel

United States Patent Office 2,737,870
Patented Mar. 13, 1956

2,737,870

APPARATUS FOR MOUNTING EARTH WORKING TOOLS IN CULTIVATORS AND THE LIKE

Einar Cook, Clovis, Calif.

Application May 17, 1952, Serial No. 288,485

6 Claims. (Cl. 97—201)

The present invention relates to earth working implements and more particularly to an improved apparatus for mounting earth working tools in cultivators and the like.

Conventional cultivators are known to employ frames which mount downwardly extending shanks to which are secured shovels of various types suited to earth working purposes. Such cultivators frequently are damaged by their shovels striking obstructions such as large roots or rocks buried in earth being worked thereby. Rigid shanks fail to accommodate any rearward flexing and thus provide no relief for shovels engaged with unyielding obstructions, or said shanks mounting the shovels, and transmit excessive stresses to frames in which such shanks are mounted. Conventional resilient shanks, such as those employed in spring tooth cultivators, frequently flex beyond the normal strength limits of the material of which they are formed and are broken thereby. Further, such excessive flexing results in uneven and relatively haphazard working of soil containing a multiplicity of such obstructions typified by cultivated moraine deposits containing cobblestones and the like.

An object of the present invention is to provide an improved cultivator adapted to work earth containing obstructions with a maximum of uniformity and a minimum of damage to the cultivator.

Another object is to provide an improved apparatus for mounting earth-working tools in implements adapted to flex within predetermined limits incident to obstruction engagement and dependably to resist flexing beyond said predetermined limits.

Another object is to provide an improved resilient shank for earth-working tools.

Another object is to provide a combined resilient shank for earth working tools and a rigid stop engageable by the resilient shank in response to a predetermined extent of flexing.

Further objects and advantages will become apparent in the subsequent description in the specification.

Still further objects and advantages are to provide improved elements and arrangements thereof in a device of the character and for the purposes set forth that are economical to produce, durable in structure, conveniently replaceable, and fully effective in accomplishing their intended purposes.

Referring to the drawing.

Figure 1:
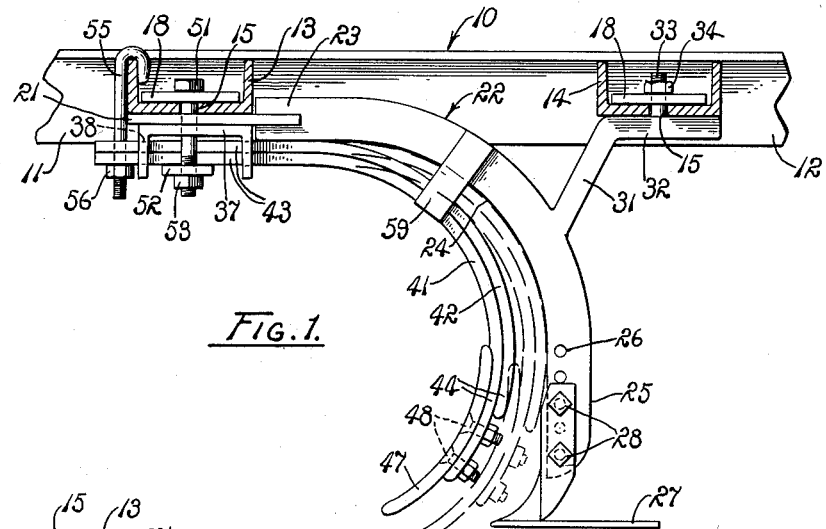
Fig. 1 is a fragmentary longitudinal section of a typical cultivator frame showing in side elevation the apparatus of the present invention mounted in the frame.
Figure 2:
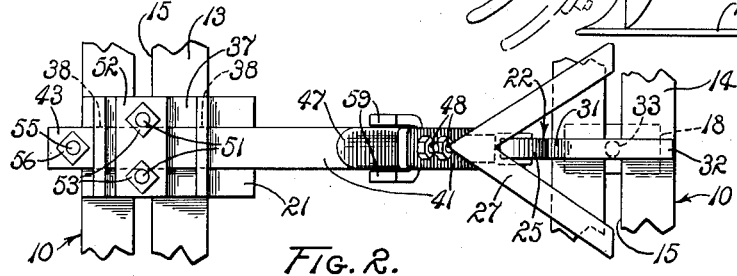
Fig. 2 is a bottom view of the apparatus of the present invention shown in Fig. 1 with portions of the frame fragmentarily represented for illustrative convenience.
Figure 3:
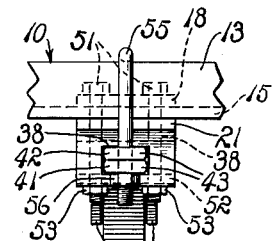
Fig. 3 is a front view of the apparatus of the present invention shown in Figs. 1 and 2.
Figure 4:
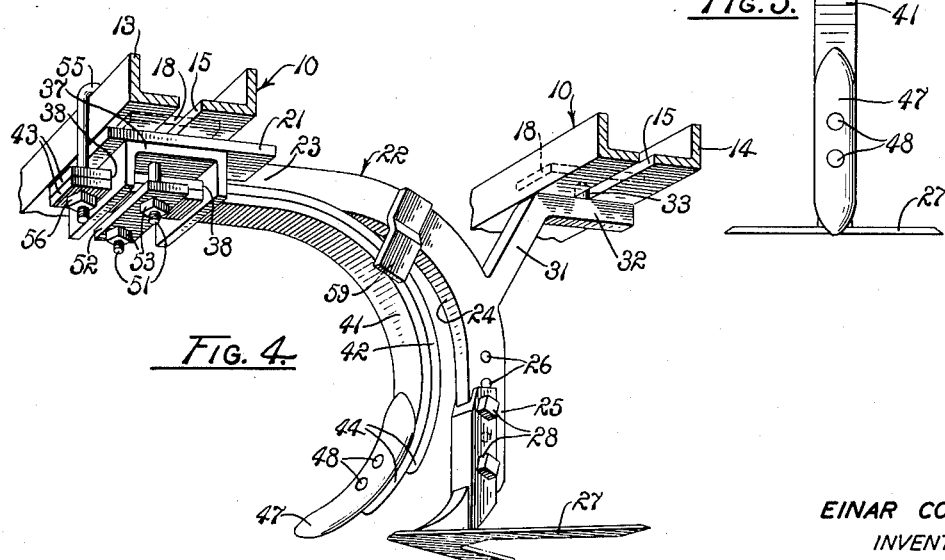
Fig. 4 is a perspective view of the apparatus shown mounted in a fragmentarily represented frame.

Referring in greater detail to the drawing:

An elongated cultivator frame of any suitable form is represented generally at 10 having a forward end portion 11 and a rearward end portion 12. The frame is shown for illustrative purposes only and may take many forms. Further, the frame may be wheel-supported, tractor supported, rested on earth working tools subsequently described, drawn in earth traversing movement by any suitable means, or pushed in earth traversing movement, as desired. The frame provides a forward transverse member 13 and a rearward transverse member 14 in substantially parallel relation and preferably of upwardly disposed channel iron. For adjusting convenience, the members 13 and 14 preferably provide longitudinal slots 15.

Mounting plates 18 are slidably positioned in the channels of each of the transverse members 13 and 14 in as many predetermined positions in the frame 10 as desired.

A bracket plate 21 is fitted upwardly against the forward transverse member 13 and an elongated substantially semi-parabolic stop 22 weldably or otherwise rigidly secured to the bracket plate 21 and rearwardly and downwardly extended therefrom. The stop provides a substantially straight mounting portion 23, a downwardly and forwardly disposed concave surface 24, and a substantially vertical downwardly extended end 25 providing bores 26 therethrough for the convenient mounting of auxiliary earth working tools thereon, such as a weed cutter 27, or the like, as by bolts 28.

A brace 31 integral with, or rigidly mounted on the stop is upwardly and rearwardly extended therefrom and provides a substantially horizontal arm 32 fitted upwardly against the rearward transverse member 14. The brace is rigidly mounted in position by extending a bolt upwardly therefrom through the slot 15 and the mounting plate 18 of the rearward member 14, and tightening the arm 32 thereof upwardly against said member by means of a nut 34 screw-threadably mounted on the bolt.

A substantially transversely inverted U-shaped bracket 37 is fitted upwardly against the bracket plate 21 longitudinally of the forward transverse member 13 and has a pair of openings 38 formed therethrough longitudinally of the frame 10.

A pair of elongated substantially semi-parabolic shanks are mounted in overlaying relation in the bracket 37 providing a relatively inner tool shank 41 and an outer auxiliary shank 42. Each of the shanks have substantially straight mounting end portions extended through the openings 38. Said shanks 41 and 42 are rearwardly and downwardly extended from the bracket 37 in progressively forwardly increased spaced relation to the concave surface 24 of the stop 22 and the inner shank 41 has a lower end 44 extended downwardly from the outer shank 42. An earth working tool 47 is mounted on the lower end 44 of the inner shank 41 as by bolts 48.

A pair of headed bolts 51 are extended downwardly through the mounting plate 18, slot 15 of the forward transverse member 13, bracket plate 21, bracket 37, on opposite sides of the outer shank 42 and inner shank 41, and through a shackle 52. A nut 53 screw-threadably mounted on each of the bolts 51 serves to tighten the elements through which the bolts are extended into assembled relation on the forward transverse member 13 with the substantially straight portion 23 of the stop 22 and shanks 41 and 42 respectively in stacked engagement. As a further optional securing medium, an inverted J-bolt 55 is hooked over the forward edge of the forward transverse member 13 and downwardly extended through the forward ends of the shanks 41 and 42. A nut 56 is screw-threadedly mounted on the lower end of the bolt 55 and tightened upwardly against the inner shank 41. It will be apparent that by loosening the nuts 34, 53, and 56, the stop 22 and shanks 41 and 42 may be adjustably positioned transversely in the frame 10 while said stop and shanks remain substantially aligned longitudinally of the frame.

A bifurcated guide 59 is rigidly mounted on the stop 22 in spaced relation to the mounting portion 23 thereof and downwardly and forwardly extended on opposite sides of the shanks 41 and 42.

Operation

The operation of the apparatus of the present invention is believed to be clearly apparent and is briefly summarized at this point. By means of the bolts 33 and 51 and nuts 34 and 53 any desired number of stops 22 and shanks 41 and 42 are mounted in the frame 10 in adjusted spaced relation.

The frame 10 is motivated in earth traversing movement by any suitable means, not shown, with the earth working tools 47 and 27 in earth engagement. It is to be understood that the auxiliary earth working tool 27 is of incidental significance and may be optionally employed. If the earth working tool 47 strikes an obstruction, not shown, continued forward movement of the frame 10 draws the tool and the inner shank 41 and outer shank 42 rearwardly against the stop 22. The guide 59 serves at all times to maintain the shanks in alignment with the stop. The stop being rigid, rearward flexing of the shanks is limited by engagement therewith. Referring to Fig. 1, it will be readily understood that as the outer shank 42 is forced rearwardly by the inner shank 41 and the earth working tool 47 that the extent of engagement of the outer shank and stop will extend progressively downwardly of the concave surface 24 of the stop until virtually the entire length of the outer shank 42 is engaged therewith.

The limiting of rearward flexing of the shanks 41 and 42 by the stop 22 maintains the earth working tool 47 in an operable position while the resilient flexing minimizes damage thereto. The rearwardly flexed positions of the shanks 41 and 42 are shown in broken line in Fig. 1.

Immediately upon passing an obstruction, the resilience of the cooperative shanks 41 and 42 returns the same and the earth working tool 47 to the position shown in full line in Fig. 1 which is considered the most effective operating position.

The apparatus of the present invention is conveniently utilized in any suitable frame in any desired number to mount earth working tools 47 and/or 27 of any selected form. The resilience of the shanks 41 and 42 minimizes breakage and distortion normally encountered in cultivator shanks and earth working tools incident to obstruction engagement. The stop 22 limits the flexing of the shanks to ranges well within the limits of any suitable materials out of which they may be fabricated. In widespread use, the apparatus of the present invention has substantially reduced repair and maintenance expenses for cultivators and has proved conducive to improved cultivation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a cultivator having a frame, an arcuate spring tool shank rigidly mounted in the frame and arcuately rearwardly and downwardly extended therefrom, an earth working tool mounted on the tool shank in resilient earth engagement, an arcuate rigid stop rigidly mounted in the frame above the spring shank and downwardly and rearwardly therefrom rearwardly of the spring shank in progressively spaced relation thereto, and a bifurcated guide extended from the stop on opposite sides of the spring shank restricting the spring shank to flexing movement substantially toward and from the stop.

2. In a cultivator, the combination of a support frame, an elongated rigid arcuate stop having a substantially horizontal upper end segment rigidly mounted in the frame and being arcuately downwardly extended therefrom and providing a substantially vertical downwardly extended end segment, an elongated resilient arcuate auxiliary shank having an upper end segment mounted upwardly against the upper end segment of the stop and arcuately downwardly extended therefrom in progressively increased spaced relation to the stop, an elongated resilient arcuate tool shank having an upper end segment mounted upwardly against the upper end of the auxiliary shank and arcuately downwardly extended therefrom in fitted engagement with the auxiliary shank, an earth working tool mounted on the extended end of the tool shank for yielding earth engagement, and an auxiliary earth working tool mounted on the substantially vertical segment of the stop in spaced relation to the earth working tool on the auxiliary shank for substantially unyielding earth engagement.

3. In a cultivator, the combination of a frame having a predetermined direction of earth traversing movement, an arcuate spring tool shank having an end mounted in the frame and being arcuately rearwardly and downwardly extended therefrom, a cultivator shovel mounted on the extended end of the tool shank for earth engagement, an auxiliary arcuate spring shank having an end mounted in the frame and being rearwardly and downwardly extended therefrom in fitted engagement rearwardly against the tool shank, an arcuate elongated rigid stop having an end mounted in the frame and being rearwardly and downwardly extended therefrom in rearwardly spaced relation to the auxiliary shank, and a guide mounted on the stop and extended forwardly therefrom on opposite sides of the auxiliary shank and the tool shank.

4. In a cultivator, a frame having forward and rearward end portions, an elongated rigid arcuate stop having a substantially horizontal upper end segment mounted in the frame and being downwardly and rearwardly extended relative to the frame and providing a downwardly and forwardly disposed concave side, an elongated resilient arcuate auxiliary shank having an upper end segment mounted in upwardly fitted engagement against the upper end segment of the stop and being arcuately rearwardly and downwardly extended therefrom in progressively forwardly increased spaced relation to the stop, an elongated resilient arcuate took shank having an upper end segment mounted in upwardly fitted engagement against the upper end of the auxiliary shank and being arcuately rearwardly and downwardly extended therefrom in forwardly fitted engagement with the auxiliary shank, and an earth working tool mounted on the downwardly extended end of the tool shank for resilient earth engagement.

5. In a cultivator, the combination of a frame having a predetermined relative direction of movement, an elongated rigid arcuate stop having a substantially horizontal upper end segment mounted in the frame and being downwardly and rearwardly extended relative to the frame and providing a downwardly and forwardly disposed concave side, an elongated resilient arcuate auxiliary shank having an upper end segment mounted in upwarly fitted engagement against the upper end segment of the stop and being arcuately rearwardly and downwardly extended therefrom in progressively forwardly increased spaced relation to the stop, an elongated resilient arcuate tool shank having an upper end segment mounted in upwardly fitted engagement against the upper end of the auxiliary shank and being arcuately rearwardly and downwardly extended therefrom in forwardly fitted engagement against the auxiliary shank and providing a lower end downwardly extended from the auxiliary shank, an earth working tool mounted on the downwardly extended end of the tool shank for resilient earth engagement, and a bifurcated guide rigidly mounted on the stop rearwardly of the upper end segment thereof and downwardly and forwardly extended therefrom on opposite sides of the auxiliary shank and tool shank.

6. In a cultivator having an elongated support frame providing a forward transverse member and a rearward transverse member in substantially parallel relation and of upwardly disposed channel form each having a slot longitudinally thereof; a mounting plate slidably mounted in the channel of each of the transverse members; a bracket plate positioned upwardly against the forward transverse member and extended rearwardly therefrom; a substantially semi-parabolic rigid stop mounted on the extended portion of the bracket plate and extended rearwardly and downwardly therefrom and having a substantially horizontal segment attached to the plate and a substantially vertical downwardly extended segment adapted to have an earth working tool mounted thereon; a brace integral with the stop upwardly and rearwardly extended therefrom and providing a portion fitted upwardly against the rearward transverse member; a bolt extended upwardly from the brace through the slot of the rearward transverse member and the plate slidably mounted therein; a nut screw-threadably mounted on the bolt adapted to tighten the brace upwardly against the transverse member in adjusted position longitudinally of said transverse member; a bifurcated guide integral with the stop downwardly and forwardly extended from a position rearwardly adjacent to the horizontal segment thereof; a substantially transversely inverted U-shaped bracket fitted upwardly against the bracket plate longitudinally of the forward transverse member having a pair of openings formed therethrough in alignment substantially longitudinally of the frame; an auxiliary spring shank extended through the openings in the channel bracket and arcuately downwardly and rearwardly extended therefrom through the bifurcated guide in forwardly spaced relation to the stop; a tool shank extended through the openings in the bracket fitted upwardly against the auxiliary shank and extended downwardly and rearwardly in fitted engagement with the auxiliary shank and providing a downwardly directed end projected downwardly beyond the auxiliary shank; a cultivator shovel mounted on the extended end of the tool shank; a shackle positioned upwardly against the tool shank beneath the bracket, a pair of bolts extended through the shackle upwardly on opposite sides of the tool shank and auxiliary shank, through the support bracket, and the slot of the forward transverse member and mounting plate; and a nut screw-threadably mounted on each bolt adapted to tighten the shackle, shanks, bracket, and mounting plate upwardly against the forward transverse member in adjustable position longitudinally thereof.

References Cited in the file of this patent

UNITED STATES PATENTS

| | | |
|---|---|---|
| 19,886 | Williamson | Apr. 6, 1858 |
| 96,344 | Perry | Nov. 2, 1869 |
| 194,891 | Caldwell et al. | Sept. 4, 1877 |
| 228,885 | Gammill | June 15, 1880 |
| 1,042,674 | Helmbacher | Oct. 29, 1912 |

FOREIGN PATENTS

| | | |
|---|---|---|
| 29,302 | Sweden | Aug. 6, 1910 |
| 196,248 | Germany | July 27, 1907 |